United States Patent
Tietsch

(10) Patent No.: US 7,106,716 B1
(45) Date of Patent: Sep. 12, 2006

(54) METHOD AND DEVICE FOR TRANSMITTING DATA

(75) Inventor: Michael Tietsch, Kaufering (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/018,277

(22) PCT Filed: May 23, 2000

(86) PCT No.: PCT/DE00/01650

§ 371 (c)(1),
(2), (4) Date: Dec. 13, 2001

(87) PCT Pub. No.: WO00/78087

PCT Pub. Date: Dec. 21, 2000

(30) Foreign Application Priority Data

Jun. 15, 1999 (DE) .................................. 199 27 304

(51) Int. Cl.
H04Q 7/24 (2006.01)
(52) U.S. Cl. ................. 370/338; 370/235; 370/395.54; 370/255
(58) Field of Classification Search ............. 370/395.3, 370/395.32, 235, 255, 390, 395.54
See application file for complete search history.

(56) References Cited

U.S. PATENT DOCUMENTS 5,430,727 A 7/1995 Callon
5,748,634 A 5/1998 Sokol et al.
5,818,838 A * 10/1998 Backes et al. .............. 370/390
6,553,000 B1 * 4/2003 Ganesh et al. .............. 370/235
6,628,623 B1 * 9/2003 Noy .......................... 370/255

FOREIGN PATENT DOCUMENTS

EP 0 473 066 A1 3/1992
WO WO 97/18637 5/1997

OTHER PUBLICATIONS

Classical IP and ARP over ATM pp. 1-28.

* cited by examiner

Primary Examiner—Afsar Qureshi
(74) Attorney, Agent, or Firm—Bell, Boyd & Lloyd LLC

(57) ABSTRACT

A method and apparatus for transmitting data wherein it is possible to transmit data on the basis of hardware addresses from a source network device to a destination network device. The source network device assigns the data to be transmitted a fictitious hardware address which is used to identify a transmission destination without matching the latter's real hardware address prescribed by the manufacturer. The fictitious hardware address is transferred to an inventive address conversion apparatus in which the fictitious hardware address has been assigned an address information item identifying the destination network device. The address information item associated with the fictitious hardware address is then assigned to the data, which are forwarded to the destination network device using this address information item.

15 Claims, 2 Drawing Sheets

METHOD AND DEVICE FOR TRANSMITTING DATA

BACKGROUND OF THE INVENTION

The present invention relates to a method for transmitting data from a source network device to a destination network device. The present invention also relates to an address conversion apparatus for implementing the method. In this context, network devices can be understood to be network nodes in a communication and/or data network, router devices, network modules, networked personal computers and other communication and data processing devices which can be coupled to a network.

In order to switch data quickly within a network, the data are frequently transmitted in the form of data packets provided with a hardware address as destination address. Hardware addresses, which are also referred to as MAC addresses (medium access control), are addresses which are used in the data link layer (layer 2) of the OSI reference model and with which network devices (usually network modules) are provided by the manufacturer. The hardware address for a network device is stored permanently, i.e., unalterably, in the network device and is unique throughout the world.

Switching data packets on the basis of hardware addresses is typical, particularly in local area networks ("LANs"). A data packet which is provided with a hardware address for a destination network device and is sent to a LAN is recognized by the destination network device in question as being addressed to it from the hardware address and is, therefore, received for further processing or forwarding. Normally, hardware addresses are used only for addressing network devices within a local area network. If a transmission destination is situated outside the local area network, the data packets are generally transported to a router device for the local area network, which router device transfers the data packets using a network address which is additionally contained in the data packets and identifies the transmission destination. Unlike a hardware address, a network address is resident above the data link layer and can be reversibly assigned to a network device via system administration. The network addresses used are frequently "Internet Protocol addresses", also referred to as "IP" addresses below. The router device evaluates the network address in the data packets and, on the basis of this, determines an address information item identifying a destination network device which is registered in the router device and is as close as possible to the transmission destination or is possibly identical thereto. The data packets are then transferred to this destination network device using the address information item. If this destination network device does not match the ultimate transmission destination, this destination network device is responsible for transferring the data packets toward the transmission destination.

A method allowing data packets provided with an IP address to be transferred transparently via an ATM network (ATM: asynchronous transfer mode) to a transmission destination which is coupled to the ATM network and is identified by the IP address is known by the name IpoA (IP over ATM), for example. In this context, a router device uses the IP address in the data packets to determine the ATM address of an ATM exit network node which is as close as possible to the transmission destination and is used to forward the data packets in the ATM network. Aspects of this method are described in Internet specification RFC 2225, for example.

However, the evaluation of IP addresses for alternate routing which these methods require is a relatively complex operation which can generally be implemented only with a high level of circuit complexity.

It is an object of the present invention, therefore, to specify a method for transmitting data from a source network device to at least one destination network device which requires less complex address evaluation. It is also an aim to specify an address conversion apparatus for implementing the method.

SUMMARY OF THE INVENTION

The inventive method conveys data from a source network device to a destination network device using a fictitious hardware address associated with these data as destination address in the source network device. In this context, the switching on the basis of hardware addresses means that no complex evaluation of network addresses, such as IP addresses, is necessary. The fictitious hardware address referred to in this context is a hardware address information item which the source network device uses, on the basis of a transfer protocol used, to identify a transmission destination without matching the latter's hardware address prescribed by the manufacturer—also referred to below as the real hardware address. To be able, nonetheless, to transfer data associated with a fictitious hardware address to the intended destination network device, an inventive address conversion apparatus is provided. In the latter, fictitious hardware addresses are associated with a respective address information item which identifies a respective destination network device and can be used to convey the data to the respective destination network device.

The direct association between fictitious hardware addresses and address information items identifying destination network devices in the address conversion apparatus allows an address information item to be determined very easily; e.g., by accessing an association table, using a fictitious hardware address. By contrast, it would be much more difficult to determine such an address information item using an IP address instead of the fictitious hardware address. Since an IP address refers to a transmission destination at the end of a transfer chain and, in principle, any device provided with an IP address could be addressed throughout the world, there is no point in assigning IP addresses to destination network devices directly. By contrast with this, the number of fictitious hardware addresses to be managed by an inventive address conversion apparatus is limited by the fact that fictitious hardware addresses are provided only for the purpose of addressing transmission destinations registered in the source network device, so that fictitious hardware addresses can be directly assigned to address information items for destination network devices with little memory requirement.

A fundamental advantage of the present invention is that data can also be conveyed, on the basis of hardware addresses, to destination network devices situated outside the local area network of the source network device. To this end, the source network device needs to assign such a destination network device a fictitious hardware address, which the address conversion apparatus in turn assigns an address information item which can be used to convey the data to the destination network device even outside the local area network of the source network device. This significantly extends the range of application for hardware-address based addressing of network devices.

Another fundamental advantage of the present invention can be seen in that changing a real hardware address for a network device, e.g., when replacing a network module, at most requires little reconfiguration effort. This is essentially a consequence of using fictitious hardware addresses. Since these do not need to match any real hardware address for a destination network device, fictitious hardware addresses can also be retained when real hardware addresses are changed. By contrast with this, in the case of the current prior art, any change to a real hardware address for a network device requires that the hardware address tables be updated for all network devices which are meant to be able to address the altered network device using its hardware address.

The address information item associated with a fictitious hardware address in the address conversion apparatus may advantageously be a real hardware address for the destination network device; e.g., the latter's MAC address prescribed by the manufacturer. Data which are associated with a real hardware address and are transferred to the destination network device are recognized by the latter as being addressed to it and are received for the purpose of further processing or forwarding. If the real hardware address of the destination network device changes, e.g., due to a network module being replaced, it is necessary only to change the association between real and fictitious hardware addresses in the address conversion apparatus in order to be able to address the destination network device using the unaltered fictitious hardware address.

Alternatively, the address information item assigned to the data may also be a network address, for example an IP address or an ATM address, for the destination network device. Such a network address also allows addressing of destination network devices which are situated in a different communication network than the source network device.

In accordance with one advantageous embodiment of the present invention, one or more fictitious hardware addresses to be used as destination address can be formed by the address conversion apparatus and transmitted to the source network device. In this context, fictitious hardware addresses need to be formed such that they are unique in the local area network including the source network device and the address conversion apparatus and also do not match any real hardware address in this local area network.

In accordance with another advantageous embodiment of the present invention, an inquiry from the source network device after a hardware address for a network device identified by an address information item contained in the inquiry, e.g., an IP address, can be answered by the address conversion apparatus on behalf of the network device in question. Such inquiries may be made, for example, under the "ARP protocol" (address resolution protocol). For this purpose, the address conversion apparatus transmits a fictitious hardware address associated with this address information item in the address conversion apparatus to the inquiring source network device. This is a simple way of entering fictitious hardware addresses into a hardware address table, used for hardware addressing, associated with the source network device. The fictitious hardware addresses entered are then used for all subsequent data transmissions.

In accordance with one advantageous embodiment of the present invention, the data to be transferred can be transmitted from the source network device to the destination network device via the address conversion apparatus. As such, the address information item to be used to forward the data to the destination network device can be assigned to the data actually in the address conversion apparatus. In addition, the data can be converted in the address conversion apparatus in line with a transfer protocol used by the destination network device. As such the source network device requires no functionality going beyond the framework of conventional hardware-address based data transmission in order to perform data transmission in accordance with the present invention. The source network device need merely be connected to an inventive address conversion apparatus which can address the destination network device. This allows, by way of example, conventional router devices designed for connecting local area networks directly to be connected to an external communication network, and hence to be coupled to one another, via a respective inventive address conversion apparatus.

Additional features and advantages of the present invention are described in and will be apparent from, the following Detailed Description of the Invention and the Figures.

DETAILED DESCRIPTION OF THE INVENTION

Figure 1:
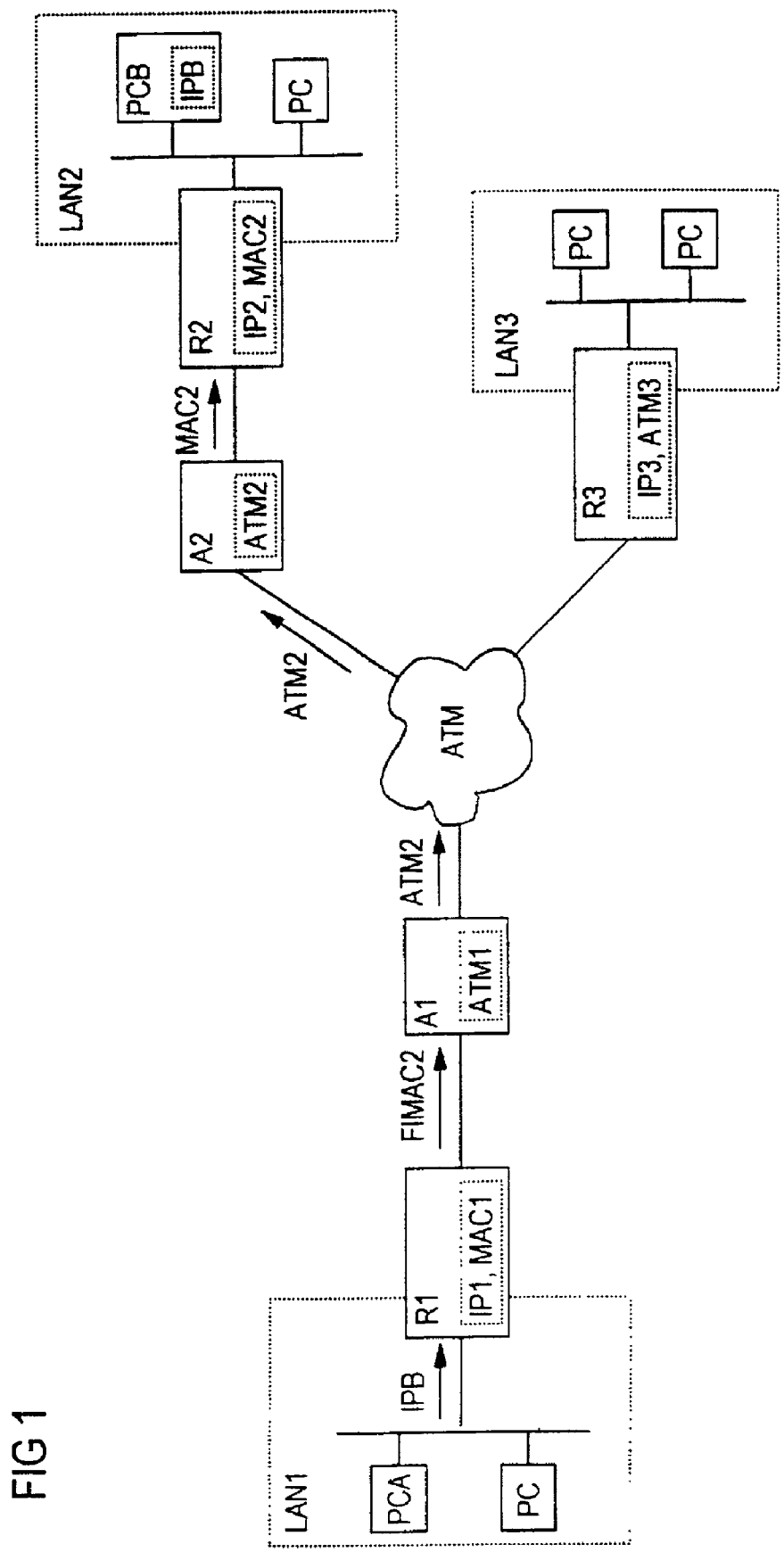
FIG. 1 shows a schematic illustration of three local area networks coupled via an ATM network.

FIG. 1 is a schematic illustration of three local area networks LAN1, LAN2 and LAN3 coupled via an ATM network ATM. The local area networks LAN1, LAN2 and LAN3 each include a number of personal computers PC, PCA, PCB coupled locally via Ethernet or FDDI (fiber distributed data interface), for example, and are respectively coupled to the ATM network ATM via a router device R1, R2 or R3. Whereas the router device R1 for the local area network LAN1 and the router device R2 for the local area network LAN2 are respectively connected to the ATM network ATM via an address conversion apparatus A1 or A2, the router device R3 for the local area network LAN3 is connected to the ATM network ATM directly. The router devices R1 and R2 are conventional router devices which are actually designed for connecting local area networks directly. By contrast, its direct connection to the ATM network ATM means that the router device R3 needs to have not only conventional router functionality but the capability for protocol conversion between a transfer protocol used in the ATM network ATM and a transfer protocol used in the local area network LAN3. The router devices R1, R2 and R3 and also the address conversion apparatuses A1 and A2 are considered to be special embodiments of network devices within the context of the exemplary embodiment.

The router devices R1 and R2 have been assigned a respective MAC address MAC1 and MAC2 as real hardware address by the manufacturer and have been assigned a respective IP address IP1 or IP2 by system administration, in the order specified. The router device R3 has an associated IP address IP3 and, in addition, an ATM address ATM3 as network address. The address conversion apparatuses A1 and A2 also have respectively associated ATM addresses ATM1 or ATM2 as network address. In addition, the personal computer PCB has the associated IP address IPB. The router devices R1, R2 and R3, the address conversion apparatuses A1 and A2 and also the personal computer PCB are respectively uniquely identified by the respectively associated addresses MAC1, MAC2, IP1, IP2, IP3, IPB, ATM1, ATM2 and ATM3.

Figure 2:
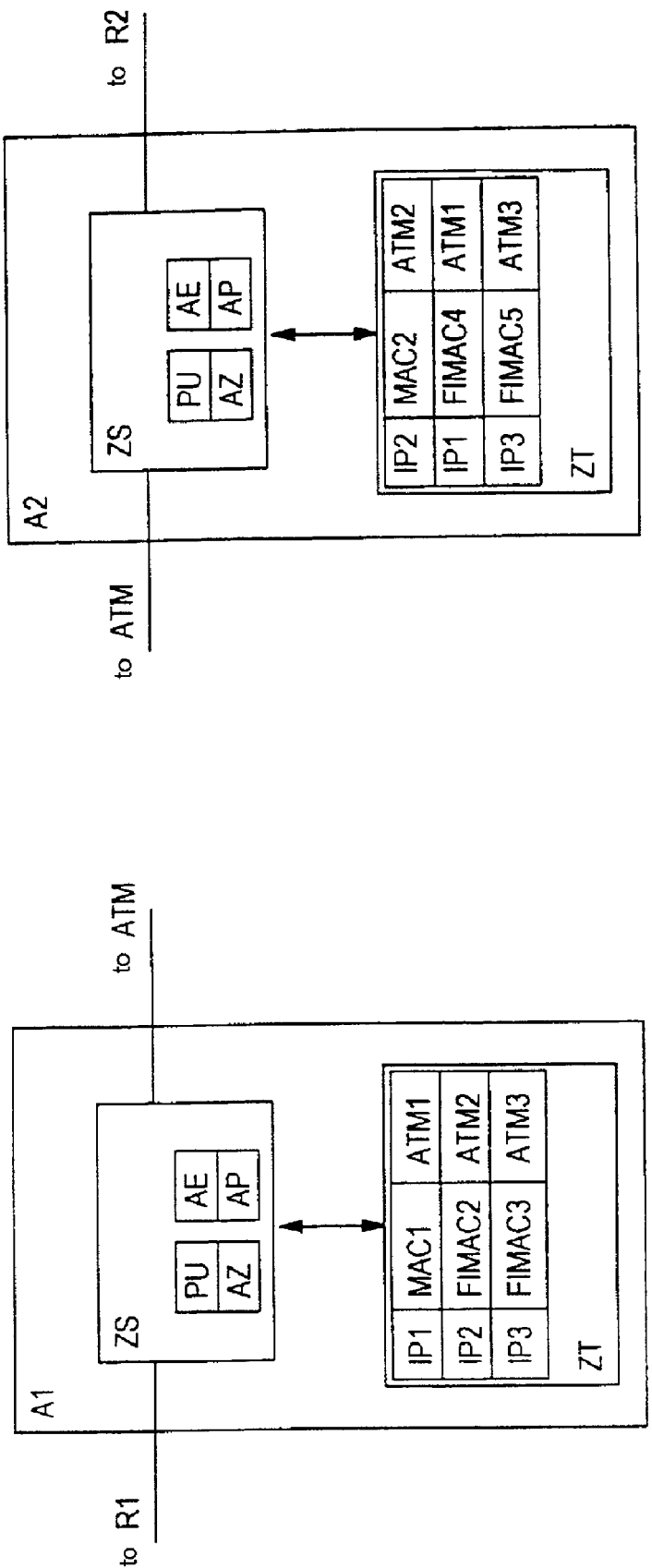
FIG. 2 shows a schematic illustration of two address conversion devices.

FIG. 2 shows a schematic illustration of the address conversion apparatuses A1 and A2 via which the router devices R1 and R2 are coupled to the ATM network ATM. The address conversion apparatuses A1 and A2 each contain, as functional components, a central controller ZS including a protocol conversion apparatus PU, an address assignment device AZ, an address determination device AE and an address checking device AP, and also an association table memory ZT which can be accessed by the central controller ZS. In both address conversion apparatuses A1 and A2, the protocol conversion apparatus PU and the address assignment device AZ, and the address determination device AE and the address checking device AP, are respectively produced in a joint module.

In this exemplary embodiment, the association table memories ZT in the address conversion apparatuses A1 and A2 each contain at least three entries, in accordance with the number of local area networks LAN1, LAN2 and LAN3 coupled. The association table memory ZT in the address conversion apparatus A1 contains a first entry with the IP address IP1, the MAC address MAC1 and the ATM address ATM1, a second entry with the IP address IP2, a fictitious MAC address FIMAC2 and the ATM address ATM2, and also a third entry with the IP address IP3, a fictitious MAC address FIMAC3 and the ATM address ATM3.

The association table memory ZT in the address conversion apparatus A2 correspondingly contains a first entry with the IP address IP2, the MAC address MAC2 and the ATM address ATM2, a second entry with the IP address IP1, a fictitious MAC address FIMAC4 and the ATM address ATM1, and also a third entry with the IP address IP3, a fictitious MAC address FIMAC5 and the ATM address ATM3. In this context, the elements of each entry are respectively stored associated with one another.

The fictitious MAC addresses FIMAC1, FIMAC2, FIMAC4 and FIMAC5 each have the format of a hardware address. The fictitious MAC address FIMAC2 or FIMAC3 is used by the router device R1 to address the router device R2 or R3, and the fictitious MAC address FIMAC4 or FIMAC5 is used by the router device R2 to address the router device R1 or R3. To this end, the fictitious MAC addresses FIMMAC2, FIMAC3 are entered into a routing table (not shown) for the router device R1, and the fictitious MAC addresses FIMAC4, FIMAC5 are entered into a routing table (not shown) for the router device R2. The fictitious MAC addresses FIMAC1, FIMAC2, FIMAC4 and FIMAC5 are fictitious insofar as they match none of the real hardware addresses MAC1 and MAC2, prescribed by the manufacturer, of the router devices R1 and R2 which they address, or they are not based on any real hardware address as in the case of the router device R3. Nevertheless, the fictitious MAC addresses are treated as real MAC addresses from the point of view of the router devices R1 and R2.

The fictitious MAC addresses FIMAC2, FIMAC3 and FIMAC4, FIMAC5 are entered into the routing tables for the router devices R1 and R2 by the address conversion apparatuses A1 and A2 under the "ARP" protocol (address resolution protocol). Under this ARP protocol, inquiries from the router device R1 or R2 after MAC addresses for network devices are answered by the address conversion apparatus A1 or A2 on behalf of these network devices. In the course of such a request, the inquiring router device R1 or R2 transfers an IP address to the connected network devices with the order to send the MAC address of the network device identified by the IP address to the router device R1 or R2, if known. By way of example, such an inquiry after the MAC address of the router device R2 identified by the IP address IP2 may be transmitted from the router device R1 to the address conversion apparatus A1. In such a case, the address conversion apparatus A1 first checks whether the IP address transferred with the inquiry, in this case IP2, is held in the association table memory ZT. If it is, the inquiry is answered by the address conversion apparatus A1 by sending the MAC address associated with this IP address in the association table memory ZT, in this case the fictitious MAC address FIMAC2, to the inquiring router device R1. The fictitious MAC address FIMAC2 transmitted to the router device R1 is then entered by the router device R1 into its routing table as MAC address for the router device R2. Inquiries from the router device R2 are answered by the address conversion apparatus A2 in a similar manner.

The fact that such inquiries are answered on a delegated basis by fictitious MAC addresses FIMAC2, FIMAC3 and FIMAC4, FIMAC5 stored in the address conversion apparatuses A1 and A2 allows for the real hardware addresses MAC1, MAC2 no longer to be obtained in a complex manner via the communication network ATM. It also becomes unnecessary for each change to a real hardware address for a router device coupled via the ATM network ATM, e.g., as a result of a network module being replaced, to involve the routing tables for all other router devices being updated.

The text below considers data being conveyed on the basis of hardware addresses between the local area networks LAN1, LAN2, LAN3 using the example of data transmission from the local area network LAN1 to the local area network LAN2.

To transmit data from the personal computer PCA situated in the local area network LAN1 to the destination personal computer PCB situated in the local area network LAN2, the data are transmitted to the router device R1 in the form of data packets containing the IP address IPB of the destination personal computer PCB. The router device R1 uses the routing table it contains to ascertain that the destination personal computer PC2 identified by the IP address IPB can be reached via the router device R2. Consequently, the router device R1 provides the data packets to be transmitted with the fictitious MAC address FIMAC2 obtained from the address conversion apparatus A1 as the hardware address for the router device R2. The IP address IPB of the destination personal computer PCB is maintained unaltered in the data packets in this context. The data packets are then forwarded from the router device R1 to the address conversion apparatus A1.

In the address conversion apparatus A1, the address checking device AP first checks whether the fictitious MAC address FIMAC2 received is held in the association table memory ZT. If it is, the address determination device PE determines the ATM address associated with the fictitious MAC address FIMAC2 in the association table memory ZT (in this case ATM2), which ATM address identifies that address conversion apparatus A2 via which the router device R2 is coupled to the ATM network ATM. The data packets to be transmitted are then converted by the protocol conversion apparatus PU, in line with the transfer protocol used in the ATM network ATM, into ATM cells to which the ATM address ATM2 is assigned as network address by the address assignment device AZ. The ATM cells are then forwarded to the ATM network ATM and are transferred therefrom to the address conversion apparatus A2 identified by the ATM address ATM2. In this context, the ATM cells may be transferred both via one or more fixed connections (PVC: permanent virtual circuit) and via one or more switched connections (SVC: switched virtual circuit) to be set up as required in the ATM network ATM.

The address conversion apparatus A2 converts the ATM cells into data packets in line with the IP protocol again, the data packets being provided with the real MAC address MAC2 of the router device R2, which is held in the association table memory ZT in this address conversion apparatus A2. The data packets are then forwarded to the router device R2, which recognizes the data packets as being addressed to it from the real MAC address MAC2 associated with them. The router device R2 then forwards the data packets received, after evaluating their IP address IPB, to the destination personal computer PCB identified by the IP address IPB.

Data packets are transferred from the local area network LAN1 to a destination personal computer PC situated in the local area network LAN3 in a largely similar manner, with the difference that, in this case, the data packets are addressed to the router device R3 directly using the ATM address ATM3. The router device R3 therefore needs to have both protocol conversion functionality and routing functionality.

In the present exemplary embodiment, fictitious MAC addresses are effective only for communication between a router device and the respective address conversion apparatus connected directly thereto. In this context, a router device and the address conversion apparatus connected directly thereto form a separate local area network. Hence, the fictitious MAC addresses FIMAC2, FIMAC3 of the address conversion apparatus A1 can be used independently of the fictitious MAC addresses FIMAC4, FIMAC5 of the address conversion apparatus A2. In particular, the fictitious MAC addresses FIMAC2 and FIMAC3 used by the address conversion apparatus A1 can match the fictitious MAC addresses FIMAC4 and FIMAC5 used by the address conversion apparatus A2. Fictitious MAC addresses can therefore be formed in an address conversion apparatus or assigned by system administration independently of the fictitious MAC addresses of another address conversion apparatus.

To allow a router device R1 or R2 to address network devices uniquely using fictitious MAC addresses, these MAC addresses need to be unique within the local area network formed by the router device and the address conversion apparatus connected directly thereto. In particular, a fictitious MAC address must not match any real or other fictitious MAC address in this local area network. This may be ensured, by way of example, by allocating real MAC addresses of old network devices no longer in use as fictitious MAC addresses. Alternatively, fictitious MAC addresses may be taken from a contingent reserved only for this purpose. Since fictitious MAC addresses can be repeated in different local area networks, this requires the provision of only one contingent within the scope of an appropriate maximum size for a local area network. The measures cited ensure that no conflict arises between a fictitious MAC address and a real MAC address even when real MAC addresses are changed within the local area network; e.g., due to a network module being replaced.

Although the present invention has been described with reference to specific embodiments, those of skill in the art will recognize that changes may be made thereto without departing from the spirit and scope of the invention as set forth in the hereafter appended claims.

The invention claimed is:

1. A method for transmitting data from a source network device to a destination network device, the method comprising the steps of:
    assigning the data, via the source network device, a fictitious hardware address as destination address, the fictitious hardware address being a hardware address information item which the source network device uses, based on a transfer protocol used, to identify a transmission destination without matching a manufacturer-prescribed hardware address of the transmission destination;
    transmitting the fictitious hardware address from the source network device to an address conversion apparatus;
    checking, via the address conversion apparatus, whether the transmitted fictitious hardware address matches a stored fictitious hardware address stored in a memory of the address conversion apparatus;
    assigning the data an address information item, if a result of the check is positive, which is associated with the transmitted fictitious hardware address in the address conversion apparatus;
    identifying, via the address information item, the destination network device; and
    using the address information item to forward the data to the destination network device.

2. A method for transmitting data from a source network device to a destination network device as claimed in claim 1, wherein the address information item assigned to the data is a real hardware address for the destination network device.

3. A method for transmitting data from a source network device to a destination network device as claimed in claim 1, wherein the address information item assigned to the data is a network address for the destination network device.

4. A method for transmitting data from a source network device to a destination network device as claimed in claim 1, wherein the fictitious hardware address used as the destination address is formed by the address conversion apparatus and is transmitted to the source network device.

5. A method for transmitting data from a source network device to a destination network device as claimed in claim 1, the method further comprising the steps of:
    answering an inquiry from the source network device, after a hardware address for a network device identified by an address information item contained in the inquiry, by the address conversion apparatus; and
    transmitting to the source network device via the address conversion apparatus, a fictitious hardware address associated with the address information item in question.

6. A method for transmitting data from a source network device to a destination network device as claimed in claim 5, wherein the address information item contained in the inquiry is a network address.

7. A method for transmitting data from a source network device to a destination network device as claimed in claim 1, wherein the hardware address is an MAC address.

8. A method for transmitting data from a source network device to a destination network device as claimed in claim 1, wherein the data are transmitted from the source network device to the destination network device via the address conversion apparatus.

9. A method for transmitting data from a source network device to a destination network device as claimed in claim 8, wherein the data are converted in the address conversion apparatus in line with a transfer protocol used by the destination network device.

10. An address conversion apparatus for converting fictitious hardware addresses into address information items identifying at least one destination network device, the fictitious hardware address being a hardware address information item which a source network device uses, based on a transfer protocol used, to identify a transmission destination without matching a manufacturer-prescribed hardware address of the transmission destination, the apparatus comprising:

- an association table memory in which at least one fictitious hardware address is stored associated with a respective address information item which identifies a destination network device;
- an address checking device for checking whether a fictitious hardware address coming from the source network device matches a fictitious hardware address stored in the association table memory; and
- an address determination device for determining the address information item associated with a fictitious hardware address which comes from the source network device and is stored in the association table memory.

11. An address conversion apparatus as claimed in claim 10, further comprising:

- an address assignment device for assigning data which come from the source network device and are associated with a respective fictitious hardware address to an address information item associated with the respective fictitious hardware address in the association table memory.

12. An address conversion device as claimed in claim 11, further comprising a protocol conversion apparatus for converting the data coming from the source network device in line with a transfer protocol used by the destination network device.

13. An address conversion apparatus as claimed in claim 10, further comprising a device for forming fictitious hardware addresses to be used as destination addresses.

14. An address conversion apparatus as claimed in claim 10, further comprising an address resolution device for answering inquiries from the source network device after a hardware address for a network device, which is identified by an address information item contained in the inquiry, by looking up the fictitious hardware address associated with the address information item in the association table memory and transmitting it to the source network device.

15. An address conversion device as claimed in one claim 10, further comprising a part for entering address information items into the association table memory.

* * * * *